United States Patent [19]
Ellison

[11] Patent Number: 5,080,629
[45] Date of Patent: Jan. 14, 1992

[54] OPENER FOR THE SHELLS OF CRUSTACEANS

[76] Inventor: Abram A. Ellison, 3320 Spinnaker La., Apt. 14A, Detroit, Mich. 48207

[21] Appl. No.: 630,502

[22] Filed: Dec. 20, 1990

[51] Int. Cl.$^5$ ............................................. A22C 29/02
[52] U.S. Cl. ........................................ 452/6; 30/120.1
[58] Field of Search ........................... 452/6; 30/120.1

[56] References Cited

U.S. PATENT DOCUMENTS

| | | | |
|---|---|---|---|
| 4,172,306 | 10/1979 | Hopkins | 452/6 |
| 4,200,961 | 5/1980 | Mueller | 452/6 |
| 4,569,103 | 2/1986 | Taurinskas | 452/6 |

FOREIGN PATENT DOCUMENTS 230885  2/1911  Fed. Rep. of Germany .......... 452/6

*Primary Examiner*—Willis Little
*Attorney, Agent, or Firm*—Peter D. Keefe

[57] ABSTRACT

An opener which permits the user to easily, simply and effortlessly open the shell of crustaceans, particularly the shells of lobsters and crabs. A pair of mutually parallel, closely spaced prongs are provided, each prong projecting outwardly from a base. The mutually facing portion of each prong is provided with a blade, and each blade is uniformly spaced a predetermined distance from the other blade. Each prong tapers gently from the base to a blunted pointed end. A handle is connected with the base opposite the prongs. In operation, the opener is manipulated relative to the shell of the crustacean so that the portion of the shell to be opened is located between the prongs. An upward movement of the handle easily slices through the shell progressively along the lower of the prongs toward the blunted end. Further insertion of the prongs into the shell will yield additional slices of the shell until the shell is opened and the meat nicely exposed for eating.

8 Claims, 1 Drawing Sheet

OPENER FOR THE SHELLS OF CRUSTACEANS

BACKGROUND OF THE INVENTION

1. Field of the Invention

The present invention relates to openers for the shells of crustaceans, particularly lobsters and crabs.

2. Description of the Prior Art

Crustaceans are a class of marine animals, which includes notably lobsters and crabs, having excellent tasting meat. They also are covered by an exterior boney shell which serves to make difficult getting at that meat. It is well known that the gastronomical delight of crustacean delicacies is more often than not offset by the frustration encountered by the difficulty opening the shell to get at the prized meat.

In the prior art there are two devices which offer some assistance to the frustrated diner.

The first of these is a seafood pliers, similar in many respects to a nutcracker. This device utilizes a pair of lever arms joined pivotally at one end. The shell of the crustacean is placed between the lever arms and the lever arms are leverably closed together, thereby crushing the shell. Unfortunately, crustacean shells come in a wide variety of shapes and brittleness which frequently renders seafood pliers helpless to assist the diner to get at his or her meal. Indeed, the crustacean shell is more often than not softened by the boiling process that cooked the meat, rending the seafood pliers totally inapplicable to the task of cracking the shell.

The second of these is a seafood fork, similar in many respects to a conventional fork, but generally much smaller and narrower. The seafood fork can get at crustacean meat provided the shell has been broken in advance. Using the seafood fork to crack the shell is a very dangerous affair, as the pressures that must be administered can easily result in the fork missing the shell and entering the hand of the diner.

Clearly, what is needed is a device which easily and simply enables a diner to open the shell of a crustacean so that concentration may be had on eating the dinner rather than working at access to the dinner.

SUMMARY OF THE INVENTION

The present invention is an opener which permits the user to easily, simply and effortlessly open the shell of crustaceans, particularly the shells of lobsters and crabs.

A pair of mutually parallel, closely spaced elongated prongs are provided, each prong projecting outwardly from a base. The mutually facing portion of each prong is provided with a blade, and each blade is uniformly spaced a predetermined distance from the other blade. Each prong tapers gently from the base to a blunted pointed end. A handle is connected with the base opposite the prongs.

In operation, the opener is manipulated relative to the shell of the crustacean so that the portion of the shell to be opened is located between the prongs. An upward movement of the handle easily slices through the shell progressively along the lower of the prongs toward the blunted end. Further insertion of the prongs into the shell will yield additional slices of the shell until the shell is opened and the meat nicely exposed for eating.

Accordingly, it is an object of the present invention to provide an opener for the shells of crustaceans which permits easy, simple, effortless and safe cutting of the shell so as to expose the meat thereinside.

It is a further object of the present invention to provide an opener for the shells of crustaceans that operates effectively whether or not the shell is of irregular shape or of a soft consistency.

These, and additional objects, advantages, features and benefits of the present invention will become apparent from the following specification.

DETAILED DESCRIPTION OF THE PREFERRED EMBODIMENT

Figure 1:
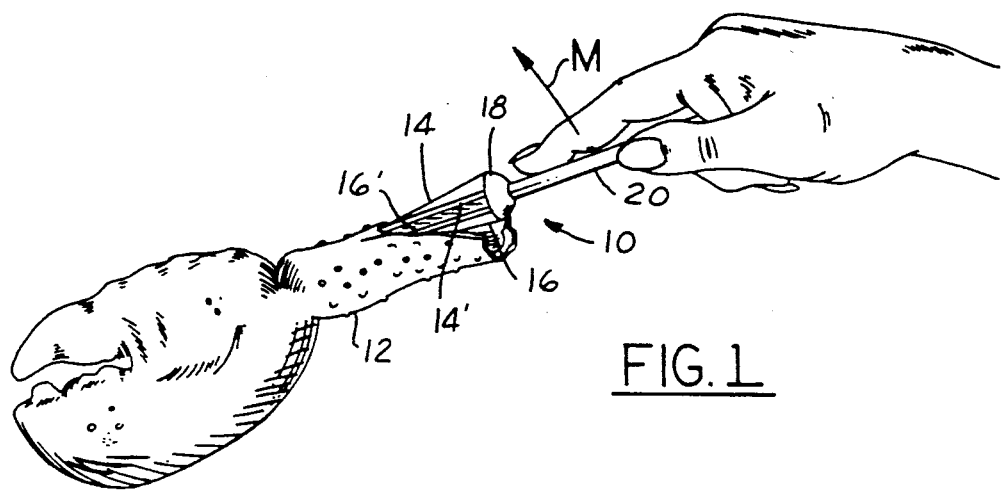
FIG. 1 is a perspective view of the opener according to the present invention shown in operation on the shell of a crustacean, specifically a lobster claw.

Referring now to the Drawing, FIG. 1 shows the opener 10 according to the present invention in operation opening the shell 12 of a crustacean. It will be seen that the opener 10 is composed of a pair of mutually parallel, closely spaced, substantially equally elongate prongs 14 and 16, each prong projecting outwardly from a base 18. The mutually facing portion of each prong is provided with a blade 14' and 16', respectively, and each blade is uniformly spaced a predetermined distance from the other blade, which will be elaborated below. Each prong 14, 16 preferably tapers gently from the base 18 to a blunted, pointed end 14a and 16a, respectively (see FIG. 2). A handle 20 is connected with the base opposite the prongs.

Figure 2:
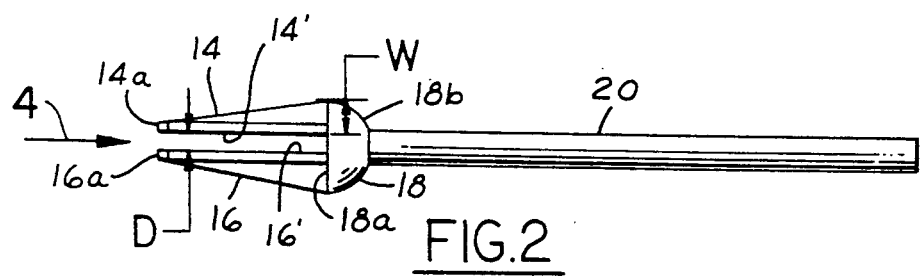
FIG. 2 is a side view of the opener according to the present invention.
Figure 3:
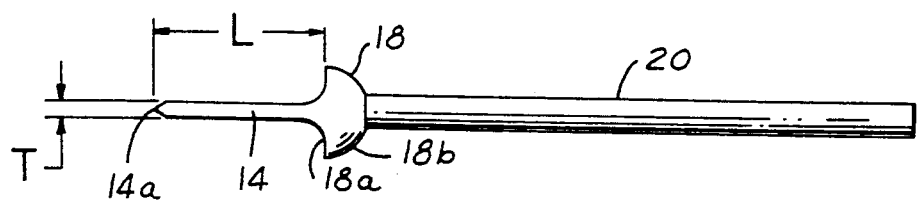
FIG. 3 is a top plan view of the opener according to the present invention.
Figure 4:
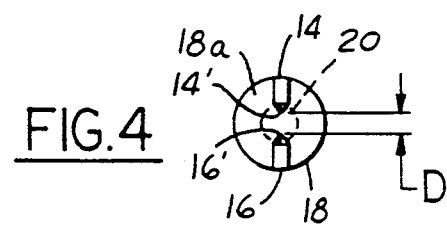
FIG. 4 is a front end view of the opener according to the present invention, seen along arrow 4 in FIG. 2.

The precise structure of the opener 10 can be understood with reference now being made to FIGS. 2 through 4. The prongs 14, 16 are preferred to be on the order of an inch in length L, mutually separated from each other preferably by a distance D of one-eight inch, and preferred to be of a width W adjacent the base, and be of a thickness T, where W is preferred to be on the order of five thirty-seconds inch and T is preferred to be on the order of three thirty-seconds inch. The distance of separation D is determined by the thickness of average crustacean shells so that the shell may easily be placed between the blades 14', 16'. The length L of the prongs is determined by the leverage needed to split open the most recalcitrant of these and further by the convenience of making as long a slice in the shell as is reasonably feasible as the opener is operated, as described hereinbelow. The cross-section of the prongs, including the width W, is determined by the mechanical properties of the prongs to adequately support the blades. The base 18 is preferred to be of circular cross-section, with a flat face 18a facing the prongs 14, 16, and a curved face 18b facing the handle 20. The handle 20 is preferred to be on the order of three and one-half inches in length, this length being determined by length needed by a user to grip it in his or her hand and be able to exercise a reasonable degree of control over the opener 10.

It is preferred that the base 18, the handle 20 and the prongs 14, 16 be integrally constructed, and further that the opener 10 be preferably made of a durable, noncorrosive material, such as stainless steel.

Operation of the opener 10 will now be described, with general reference being made to the Drawing.

The opener is gripped by the user at the handle as shown generally in FIG. 1. The opener is then manipulated relative to the shell of the crustacean so that the portion of the shell to be opened is located between the prongs. An upward movement along arrow M of the handle causes blade 16', the active blade, to easily slice through the shell progressively therealong toward the blunted end 16', while the other blunted end 14' is being used as a fulcrum by blade 16' as it leverably is forced against the shell. Further insertion of the prongs into the shell will yield additional slices of the shell until the shell is opened and the meat nicely exposed for eating.

It is to be noted that two blades 14', 16' are preferred in that each may serves as an active blade for cutting of the shell. This is particularly useful where a back-and-forth movement along arrow M is used to cut the shell. While two blades 14', 16' are preferred, those skilled in the art will recognize that it is possible to construct the opener 10 with only one blade, that blade performing the shell cutting action described herein. In the case of a single blade construction, the important structural configuration is that the ends of the prongs be separated by the distance D, as the prong without the blade may be otherwise arbitrarily spaced from the blade. Further, those skilled in the art will notice that while a blunted end 14a, 16a is preferred other shaped ends are possible including a sharply pointed end. A sharply pointed end, while requiring care by the user, would more easily enable the prong with the active blade to penetrate into the shell. With respect to crab legs, it is preferred for the prongs to have a small cross-section to enable them to enter easily into the leg. It is to be noted, also, that the prongs may serve in the capacity of a fork for handling the meat.

To those skilled in the art to which this invention appertains, the above described preferred embodiment may be subject to change or modification. For instance, while the base has been mentioned specifically, it is possible to construct the opener so that the handle, itself, serves as the base. Such change or modification can be carried out without departing from the scope of the invention, which is intended to be limited only by the scope of the appended claims.

What is claimed is:

1. An opener for opening the shell of a crustacean, the shell having a thickness, said opener comprising:
   a handle, said handle terminating at one end thereof in a base, said base having a terminal end;
   a first prong having a first end and a second end, said first end of said first prong being connected with said terminal end of said base, said first prong including a pointed blade edge extending between said first and second end thereof; and
   a second prong having a first end and a second end, said first end of said second prong being connected with said terminal end of said base, said first prong including a pointed blade edge extending between said first and second end thereof, said first prong being oriented parallel with respect to said second prong, said pointed blade edge of said first prong facing said pointed blade edge of said second prong, each said pointed blade edge being uniformly separated from the other a distance exceeding but substantially near the thickness of the crustacean shell, said first and second prongs being substantially of equal length from said terminal end of said base.

2. The opener of claim 1, wherein each said first end of said first and second prongs is pointed.

3. The opener of claim 2, wherein said first and second prongs are oriented parallel with respect to said handle.

4. The opener of claim 3, wherein said first and second prongs are each substantially one inch in length.

5. The opener of claim 4, wherein said blades of said first and second prongs are mutually separated by a distance of substantially one-eighth inch.

6. The opener of claim 5, wherein said base, said handle and said first and second prongs are integrally constructed.

7. The opener of claim 5, wherein said opener is made of stainless steel.

8. An opener for opening the shell of a crustacean, the shell having a thickness, said opener comprising:
   a handle, said handle terminating at one end thereof in a base, said base having a terminal end;
   a first prong having a first end and a second end, said first end of said first prong being connected with said terminal end of said base, said first prong including a pointed blade edge extending between said first and second end thereof; and
   a second prong having a first end and a second end, said first end of said second prong being connected with said terminal end of said base, said first prong being oriented parallel with respect to said second prong, said pointed blade edge of said first prong facing said second prong, said blade of said first prong being separated from said second end of said second prong a distance exceeding but substantially near the thickness of the crustacean shell, said first and second prongs being substantially of equal length from said base.

* * * * *